(12) United States Patent
Schardt

(10) Patent No.: US 9,995,629 B2
(45) Date of Patent: Jun. 12, 2018

(54) STATIC FOURIER TRANSFORM SPECTROMETER

(71) Applicant: Technische Universität München, Munich (DE)

(72) Inventor: Michael Schardt, Munich (DE)

(73) Assignee: Technische Universität München, Munich (DE)

( * ) Notice: Subject to any disclaimer, the term of this patent is extended or adjusted under 35 U.S.C. 154(b) by 0 days. days.

(21) Appl. No.: 15/808,898

(22) Filed: Nov. 10, 2017

(65) Prior Publication Data

US 2018/0066990 A1    Mar. 8, 2018

Related U.S. Application Data

(63) Continuation of application No. PCT/EP2016/053829, filed on Feb. 24, 2016.

(30) Foreign Application Priority Data

May 12, 2015 (DE) .................. 10 2015 208 796

(51) Int. Cl.
*G01J 3/45* (2006.01)
*G01J 3/02* (2006.01)

(52) U.S. Cl.
CPC ................ *G01J 3/45* (2013.01); *G01J 3/021* (2013.01)

(58) Field of Classification Search
CPC ..................................... G01J 3/45; G01J 3/021
See application file for complete search history.

(56) References Cited

U.S. PATENT DOCUMENTS 5,309,217 A    5/1994    Simon et al.

FOREIGN PATENT DOCUMENTS

| CN | 103267547 A | 8/2013 |
|---|---|---|
| DE | 102006021538 A1 | 11/2007 |
| EP | 0924499 B1 | 10/2002 |
| EP | 2264416 A1 | 6/2010 |
| FR | 2787186 A1 | 6/2000 |
| WO | 2011/086357 A1 | 7/2011 |

OTHER PUBLICATIONS

Li, "Refractive Index of ZnS, ZnSe, and ZnTe and Its Wavelength and Temperature Derivatives," J. Phys. Chem. Ref. Data, vol. 13, No. 1, 1984.
Junttila et al.,"Performance limits of stationary Fourier spectrometers," J. Opt. Soc. Am. A vol. 8, No. 9/Sep. 1991.
(Continued)

*Primary Examiner* — David Porta
*Assistant Examiner* — Faye Boosalis
(74) *Attorney, Agent, or Firm* — Ewers & Hasselmann PLLC

(57) ABSTRACT

A static Fourier transform spectrometer is disclosed that includes a beam splitter, a mirror device, and a collection optic. The beam splitter divides an input light beam into a first arm and a second arm, wherein the first arm is reflected by the beam splitter and the second arm passes through the beam splitter, wherein the first arm extends to the converging optical unit without deflection after reflection at the mirror device, wherein the second arm extends to the converging optical unit without deflection after passing through the beam splitter, and wherein the collection optic merges the first arm and the second arm for interference.

18 Claims, 9 Drawing Sheets

(56) References Cited

OTHER PUBLICATIONS

Lucey et al., "A Fabry-Perot Interferometer with a Spatially Variable Resonance Gap Employed as a Fourier Transform Spectrometer," Proc. of SPIE vol. 8048, 2011.
Office action by the German Patent and Trademark Office (DPMA) and English-language machine translation thereof, issued in DE 10 2015 208 796.4, to which this application claims priority, dated Aug. 24, 2015.
International Search Report and English-language translation thereof, issued in PCT/EP2016/053829, to which this application claims priority, dated Jun. 6, 2016.
Smith et al. "Digital Array Scanned Interferometers for Astronomy," Experimental Astronomy vol. 1, pp. 389 to 405, 1991.
Junttila "Stationary Fourier-transform spectrometer," Applied Optics vol. 31, No. 21, pp. 4106 to 4112, 1992.
Möller, "Wave-front-dividing array interferometers without moving parts for real-time spectroscopy from the IR to the UV," Applied Optics vol. 34, No. 9, pp. 1493 to 1501, 1995.
Dierking et al. "Solid-block stationary Fourier-transform spectrometer," Applied Optics vol. 35, No. 1, pp. 84 to 89, 1996.
Courtial et al. "Design of a static Fourier-transform spectrometer with increased field of view," Applied Optics vol. 35, No. 34, pp. 6698 to 6702, 1996.
Chau et al. "A micromachined stationary lamellar grating interferometer for Fourier transform spectroscopy," J. Micromech. Microeng. 18, pp. 1 to 7, 2008.
International Preliminary Report on Patentability of the International Searching Authority issued in PCT/EP2016/053829, to which this application claims priority, and English-language translation thereof, dated Nov. 14, 2017.

STATIC FOURIER TRANSFORM SPECTROMETER

CROSS REFERENCE TO RELATED APPLICATIONS

This application is a continuation application of International patent application PCT/EP2016/053829, filed Feb. 24, 2016, designating the United States and claiming priority to German patent application DE 10 2015 208 796.4, filed May 12, 2015, and the entire content of both applications is incorporated herein by reference.

TECHNICAL FIELD

The disclosure relates to a static Fourier transform spectrometer. Fourier transform infrared spectroscopy (FTIR spectroscopy) has established itself as the standard method for the spectroscopic analysis of infrared radiation because of its high signal-to-noise ratio and high spectral resolution. Due to the characteristic absorption of infrared radiation by various molecules, the chemical composition of gases, liquids, and solids can be determined non-destructively by means of infrared spectroscopy. For example, numerous FTIR spectrometers are used commercially for process control, such as, e.g., in drug production for quality control or in dairies for online milk fat measurement.

BACKGROUND

Commercially available FTIR spectrometers include movable components due to their mode of operation, so that the operation of such a spectrometer under adverse environmental conditions, in particular temperature fluctuations or vibrations, is possible only by complex and expensive compensation techniques. Dispersive spectrometers typically operate without moving parts and therefore exhibit greater robustness than FTIR spectrometers at a lower cost. However, dispersive spectrometers exhibit, by virtue of their mode of action, i.e., dispersion into wavelengths and the need for an entrance slit, a significantly poorer signal-to-noise ratio in the longer wavelength infrared range, i.e., at wavelengths greater than 3 microns. Between these two extremes, FTIR spectrometers on the one hand and dispersive spectrometers on the other, stands the static FTIR spectrometer, which operates on the principle of an FTIR spectrometer, but has no moving parts. In classical FTIR spectrometers, information is acquired over time in the form of an interferogram, whereas the interferogram is generated in the static FTIR spectrometer via the location on a detector array. Thus, the advantages of FTIR spectroscopy can be combined with the advantages of dispersive spectroscopy. The result is a robust spectrometer with a high signal-to-noise ratio in the infrared range. In addition, since the interferogram in the static structure is immediately available on the detector, very fast measuring speeds are, in principle, possible.

However, due to the spatial expansion of the interferogram and the current line detector technology in the infrared wavelength range, the present static FTIR spectrometer does not achieve the performance of a classical FTIR spectrometer in terms of signal-to-noise ratio and spectral resolution.

The present disclosure describes a new static FTIR spectral apparatus that operates independently of the expansion of the light source and therefore has a high light throughput. It is characterized by the fact that it shows a much lower light loss in the spectral apparatus and a lower material consumption than existing comparable designs. At the heart of this structure is the double use of the beam splitter, once for splitting the infrared radiation into two partial beams and then for imposing a constant optical path difference due to the high refractive index of the beam splitter.

In principle, the applications of the present static FTIR spectrometer are comparable to those of a conventional FTIR spectrometer, as long as the lower signal-to-noise ratio and the lower spectral resolution of the static FTIR spectrometer can be tolerated. Due to the low use of materials and the static concept, the advantages of the disclosure emerge especially under adverse environmental conditions. Thus, the present disclosure can be used, for example, for monitoring production processes in which classic FTIR spectrometer technology is not yet economically feasible. In addition, use in fiber sensor technology for reading out fiber Bragg gratings with light sources of low intensity is possible.

Robust spectrometers in the mid-infrared range (in the wavelength range from 3 µm to 20 µm) can be found in the related art, inter alia, in the three groups described below. Further types of spectrometers for the mid-infrared range will not be discussed here because their technical implementation differs significantly from the present disclosure.

The first group are the time-modulating FTIR spectrometers, which, due to special techniques, such as, double pendulum interferometers according to [1], or retroreflectors according to [2], are robust against vibrations and temperature fluctuations, but also have a higher complexity. The excellent performance in terms of spectral bandwidth, resolution, and signal-to-noise ratio associated with the use of the Fourier transform principle makes this type of spectrometer versatile.

On the other hand, there are many dispersive techniques (grating spectroscopy, linear variable filters, bandpass systems, . . . ) in spectrometers in the mid-infrared range, whose robustness is increased without much additional effort due to the lack of moving parts. Due to the immediate availability of the spectrum on the detector, they are usually characterized by high measuring speeds. In general, these spectrometers are far less complex in construction than robust time-modulating FTIR spectrometers, but they are significantly inferior with regard to performance in terms of resolution, spectral bandwidth, and signal-to-noise ratio.

The third group of robust spectrometers in the mid-infrared range, the static FTIR spectrometers, represents a compromise between both above-mentioned principles of time-modulating FTIR spectrometers and dispersive spectrometers. Here, by skillful arrangement of optical components, the infrared radiation to be measured with a line detector is brought to interference so that a subsequent Fourier transformation of the detector signal leads to the desired spectrum. The interference signal generated in time-modulating FTIR spectrometers over time, the so-called interferogram, is thus generated by spatial expansion and recorded by a line detector, as a result of which high measuring speeds become possible.

By eliminating moving parts, static FTIR spectrometers are more robust and less complex than their time-modulating counterparts. While they are clearly inferior in terms of resolution, spectral bandwidth, and signal-to-noise ratio due to technical limitations of the line detectors to the time-modulating FTIR spectrometers, they achieve a higher light throughput or a better signal to noise ratio through the utilization of the Fourier transformation principle than dispersive spectrometers. Since the present disclosure can be assigned to the group of static FTIR spectrometers, the related art of this particular spectrometer group will now be described in more detail below.

It is a characteristic of all static FTIR spectrometers that they generate the interferogram necessary for spectral computation by spatial expansion. This is done in the related art on the one hand by tilting or providing staircase-shaped mirrors in classical Michelson or Mach-Zehnder interferometers [3], by double-mirror interferometers [4], or by miniaturized static lattice grating interferometer [5]. However, all of these concepts have a dependence of the visibility of the interferogram on the radiating surface of the light source [6]. Since the large radiating surfaces required in the above concepts (due to the low power densities in the mid-infrared range) already lead to a disappearance of the interferogram, these techniques are not suitable for spectroscopy in this wavelength range when using uncooled detectors.

On the other hand, interferograms can be created by spatial expansion using birefringent materials. In this case, the incident light is split into two orthogonal directions of polarization and then brought to interference. Thus, static Fourier transform spectrometers with a large angle of incidence can be constructed [7]. However, the necessary birefringent materials are not transparent in the mid-infrared range, so it is not possible to use this technique in this wavelength range.

Two static spectrometer designs suitable for the mid-infrared range are the static common-path interferometer [8] and the static modified Mach-Zehnder interferometer [6, p. 1461]. Since these concepts differ the least from the present disclosure, an overview of both designs is given in FIG. 1 and FIG. 2. For better illustration, the uncollimated light rays in the set-up are illustrated only by the respective focal point beam.

In both cases there is, in principle, no dependence of the visibility of the interferogram on the radiating surface of the light source used. However, the static modified Mach-Zehnder interferometer is much more difficult to adjust than the static common-path interferometer. As variants of the static common-path interferometer, a complete crystal integration of this spectrometer concept [9] as well as a combination with concave mirrors [10] are published.

CITED REFERENCES

[1] U.S. Pat. No. 5,309,217 A,
[2] EP Patent 0 924 499 B1,
[3] MÖLLER, K D: Wave-front-dividing array interferometers without moving parts for real-time spectroscopy from the IR to the UV. In: Applied optics vol. 34 (1995), No. 9, pp. 1493-1501,
[4] JUNTTILA, M L: Stationary Fourier transform spectrometer. In: Applied optics vol. 31 (1992), No. 21, pp. 4106-4112,
[5] CHAU, F S; You, Y; ZHOU, G: A micromachined stationary lamellar grating interferometer for Fourier transform spectroscopy. In: Journal of Micromechanics and Microengineering vol. 18, IOP Publishing (2008), p. 025023,
[6] JUNTTILA, M L; KAUPPINES, J; ICONS, E: Performance limits of stationary Fourier spectrometers. In: Journal of the Optical Society of America A vol. 8 (1991), No. 9, pp. 1457-1462,
[7] COURTIAL, J; PATTERSON, B A; HARVEY, A R; SIBBETT, W; PADGETT, M J: Design of a static Fourier-transform spectrometer with increased field of view. In: Applied optics vol. 35 (1996), No. 34, pp. 6698-6702,
[8] SMITH, W M H; SCHEMPP, W V: Digital array scanned interferometers for astronomy. In: Experimental Astronomy vol. 1, Springer (1990), No. 6, pp. 389-405,
[9] DIERKING, M P; KARIM, M A: Solid-block stationary Fourier transform spectrometer. In: Applied optics vol. 35 (1996), No. 1, pp. 84-89, and
[10] PCT Patent Application Publication WO 2011/086357 A1

SUMMARY

It is an object of the present disclosure to spectrally measure light incident in the spectrometer. The point of entry of the incident light, collimated or not collimated, into the disclosed spectrometer is referred to in the following text and drawings as the light source. The spectral information to be determined from objects to be measured can be introduced in various ways into the spectrometer, for example, via a glass fiber or a lens system.

By using the principle of static Fourier transform spectroscopy and the specific arrangement of the optical components, spectral measurements can be made quickly and with high light throughput. Due to the lack of moving parts, the disclosure is also insensitive to adverse environmental conditions, such as vibrations. While spectral measurements can, in principle, also be carried out up to the visible wavelength range with the aid of the present disclosure, the disclosure aims primarily at the mid-infrared range because the advantages of the disclosure, i.e., high light throughput by using light sources with large radiating surfaces and by using the Fourier transformation principle, become clearly apparent.

This object is achieved in that the incident light is divided by a specific arrangement of optical components into two sub-beams, which are then brought to a line detector for interference. The resulting interferogram on the line detector can be subsequently converted by a Fourier transformation into the spectrum of the incident light. Instead of a line detector, an array area detector can also be used. Likewise, a point detector can be used which scans a line or area. In the context of the disclosure, a line detector is understood to mean a detector which can detect light along one dimension. Likewise, the array area detector is understood to mean a detector which can detect light independently of one another in two dimensions.

The static Fourier transform spectrometer includes a beam splitter, a mirror device, and a collection optic. The beam splitter divides an input light beam into a first arm and into a second arm, wherein the first arm is reflected by the beam splitter and the second arm passes through the beam splitter. By definition, the first arm and the second arm end at the collection optic. The first arm and the second arm describe an identical optical path length. In the context of this disclosure, identical path lengths means that the optical path lengths differ by a maximum of 10%, in particular a maximum of 5%. After reflection on the mirror device, the first arm extends without deflection to the collection optic, while the second arm, after passing through the beam splitter, extends without deflection to the collection optic. In the context of this disclosure, the term "deflection-free" is understood to mean that the respective arm extends in a straight line directly to the collection optic, without being deflected or reflected by another optical element. Thus, both arms are preferably at least partially parallel. Likewise, it is preferred that the two arms impinge on the collection optic at the same angle. The collection optic merges the first arm and the second arm for interference.

Compared to the basic concepts of infrared spectroscopy mentioned in the related art, i.e., the time-modulating FTIR and the dispersive spectroscopy, the static FTIR spectroscopy shows the advantages already mentioned.

Specifically, it has a higher robustness and speed with less complexity compared to commercially available, time-modulating FTIR spectrometers. Compared to dispersive techniques, it provides a higher light throughput by using the Fourier transform principle, i.e., a better signal-to-noise ratio with similar robustness, but increasing complexity.

Particularly, a refractive index of the beam splitter is greater than a refractive index of an environment of the static Fourier transform spectrometer. In this way, an optical path length of the second arm is different from a geometrical path length of the second arm. By a depth of the beam splitter, a path length difference between optical path and geometric path of the second arm is typically adjustable. In addition, it is preferred that the optical path length of the first arm is equal to the optical path length of the second arm. With regard to the first arm, the optical path length in vacuum is typically equal to the geometric path length. If the first arm passes through ambient air, the optical path length is almost identical to the geometric path length due to the refractive index of air.

Typically, only the first arm is reflected on the mirror device. By the positioning of the mirror device, the reflection of the first arm is thus displaceable, whereby an optical path length of the first arm is adjustable. In addition, the alignment of the mirror device allows the first arm to be aligned at least in sections parallel to the second arm.

Further, the first arm is typically reflected by at most one mirror device. Thus, only the adjustment of one mirror device is necessary for the above-mentioned alignment of the first arm, so that the adjustment is very simple and inexpensive to carry out.

In an exemplary embodiment, the first arm has a first rectilinear portion extending between the mirror device and the collection optic. Likewise, the second arm typically has a second rectilinear section which extends between the beam splitter and the collection optic. In this case, the first rectilinear portion and the second rectilinear portion are aligned parallel to each other. In addition, the first rectilinear portion and the second rectilinear portion typically extend parallel to an optical axis of the collection optic. Alternatively, an angle between the first rectilinear portion and the second rectilinear portion of at most 10°, preferably at most 1°, in particular at most 0.5°, is permissible. If the detector is not exactly in the focal plane of the collection optic, correction of this misalignment is possible by a slight deviation in the parallelism of the first rectilinear portion of the first arm to the second rectilinear portion of the second arm. For example, a displacement of the detector by 5 mm relative to the collection optic can be compensated for by a rotation of the mirror device by approximately 0.2°, the collection optic preferably having a focal length of 50 mm. In this way, the intersection of the focal point beams originally merged by the collection optic reappears on the line detector.

The static Fourier transform spectrometer advantageously comprises a line detector, wherein the collection optic merges the first arm and the second arm on the line detector for interference. In one alternative, the static Fourier transform spectrometer advantageously comprises a two-dimensional array area detector, wherein the collection optic merges the first arm and the second arm on the two-dimensional array area detector for interference. If a two-dimensional array area detector is used, the interferogram of the light source is plotted in a first dimension. Along the second dimension, the individual points of the interferogram repeat along curved lines, so that the second dimension contains no additional information. However, by averaging the individual points along these curves the signal-to-noise ratio increases because the signal-to-noise ratio increases with the square root of the number of averaged values.

If a cylindrical lens is placed between the collection lens and an array area detector whose focal length and position is selected in such a way that it forms a column-oriented row of light sources along the second dimension of the detector in combination with the collection lens, the spectral information can additionally be measured spatially resolved perpendicularly to the direction of the column-oriented row. The result is a hyperspectral spectrometer. Due to the different geometric paths of both partial beams, the spatial resolution is, however, limited.

Typically, an upstream optic is arranged in front of the beam splitter. With the upstream optic, a light source can be positioned almost anywhere in front of the beam splitter. In particular, using the upstream optic eliminates the prerequisite that the light source is to be positioned as close as possible to the beam splitter. The input light beam can therefore be guided by the upstream optic onto the beam splitter. Typically, the upstream optic comprises a convex lens and/or a concave mirror, in particular, an off-axis concave mirror. Concave mirrors have the advantage over convex lenses that they have less light loss and less wavelength dependency than convex lenses. In the context of this disclosure, the concave mirror can be provided as a parabolic mirror with particularity.

Also typically, a downstream optic is arranged behind the collection optic. The downstream optic can reduce distortions due to the different geometric path lengths of the first arm and the second arm. Thus, the first arm and the second arm first pass through the collection optic and then the downstream optic. The first arm and the second arm are merged after passing through the downstream optic for interference. The downstream optic typically comprises a cylindrical lens. The cylindrical lens has, in particular, a central axis, wherein the central axis can be rotated relative to an optical axis of the collection optic from a vertical position.

With particularity, the downstream optic can be tilted relative to a straight-line section of the first arm and/or of the second arm. The first rectilinear portion of the first arm is typically parallel to the second rectilinear portions of the second arm. The downstream optic typically has an optical axis that is tilted relative to the first rectilinear portion and/or the second rectilinear portion. Typically, the angle of tilt is between 0° and 40°, in particular 20°. By tilting the downstream optic, a blurring of the interference on the line detector, array area detector, or point detector can be suppressed.

If an array area detector is used, such a tilt is not absolutely necessary.

Typically, the collection optic includes a convex lens. Alternatively or additionally, the collection optic particularly has a concave mirror, wherein the concave mirror is, more particularly, an off-axis concave mirror. As previously described, concave mirrors have the advantage over convex lenses that they exhibit less light loss and less wavelength dependence than convex lenses.

In a further exemplary embodiment, the mirror device of the static Fourier transform spectrometer is a stepped mirror. Due to the stepped mirror, the first arm of the input beam split by the beam splitter can be reflected multiple times by the mirror device. Thus, in particular, the first rectilinear section comprises a plurality of subsections, each subsection having a different optical path difference. Since a maximum path difference of an interferogram and a spectral resolution of an associated spectrum are reciprocally related, the spectral resolution is increased by the stepped mirror.

With particularity, the stepped mirror has at least two parallel mirror surfaces. The mirror surfaces are spaced apart from each other. Due to the above-mentioned reciprocal ratio, the provision of two mirror surfaces leads to a doubling of the maximum optical path difference and therefore to a halving of the spectral resolution. The provision of four parallel mirror surfaces thus results in a quarter of the spectral resolution. Therefore, by modifying the mirror device, the spectral resolution of the static Fourier transform spectrometer can be easily and inexpensively improved. If more than two parallel mirror surfaces are present, it is particularly preferred that these mirror surfaces are arranged in such a way that reflections on step walls of the mirror surfaces are prevented. This can be achieved in particular in such a way that the stepped mirror has a convex shape and, particularly preferably, when a monotonously rising staircase shape is avoided.

A distance between each of the mirror surfaces is preferably an integer multiple of a predefined step height. In particular, a number from the number space of the natural numbers, that is to say all positive integers, is to be understood by a multiple. It is particularly preferable that each mirror surface has a distance from one step height to at most one further mirror surface. In addition, it is advantageously provided that each mirror surface has a different distance from all other mirror surfaces. Due to the different distances of the multiples of a predefined step height, a different path difference exists for each mirror surface. These path differences thus differ by a multiple of the step height. Overall, therefore, the maximum path difference can be increased by the mirror surfaces, whereby the spectral resolution of the static Fourier transform spectrometer becomes finer.

The static Fourier transform spectrometer typically includes an array area detector. The collection optic merges the first arm and the second arm for interference on the array area detector. By means of the array area detector, the different path differences of the stepped mirror can be detected. For this purpose, the array area detector is divided into different sections, so that each of the different sections is assigned a mirror surface. The different optical path differences between the first arm and the second arm can be imaged in the different sections of the array area detector. The different sections can be merged algorithmically, and the total optical path difference can be increased compared to a plane mirror. Thus, the spectral resolution of the static Fourier transform spectrometer is decreased. The merging is easy to carry out, since the different sections and the associated path difference due to the respective mirror surface of the stepped mirror are known. Therefore, the spectral resolution of the static Fourier transform spectrometer is improved in terms of spectral resolution in a simple and inexpensive manner due to the step level.

BRIEF DESCRIPTION OF THE DRAWINGS

Further details, advantages, and features of the present disclosure will become apparent from the following description of exemplary embodiments with reference to the drawings, wherein.

DESCRIPTION OF EXEMPLARY EMBODIMENTS

Figure 1:
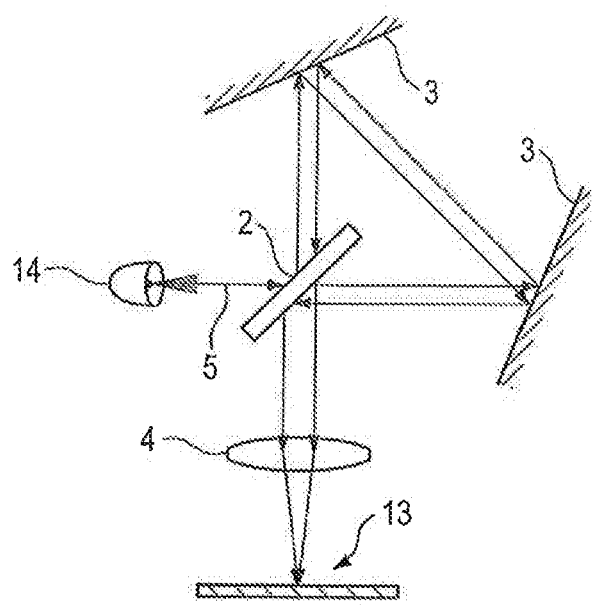
FIG. 1 shows a static common-path interferometer according to the related art.
Figure 2:
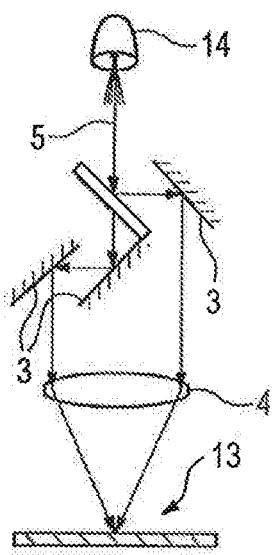
FIG. 2 shows a static modified Mach-Zehnder interferometer according to the related art.
Figure 3:
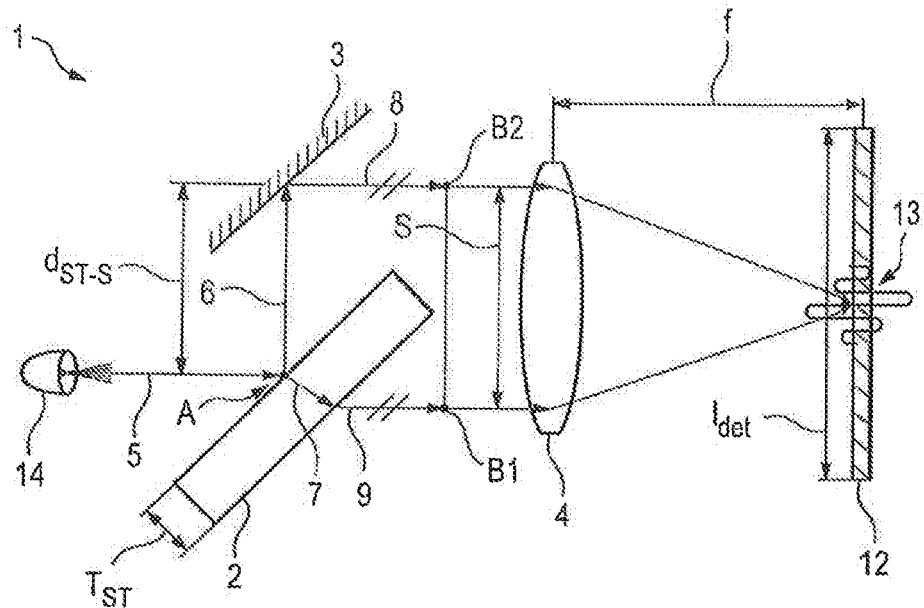
FIG. 3 shows a static Fourier transform spectrometer according to a first exemplary embodiment of the disclosure.

FIG. 3 shows a static Fourier transform spectrometer 1 according to a first exemplary embodiment of the disclosure. As shown in FIGS. 1 and 2, the uncollimated light beams in the set-up are illustrated only by the respective focal point beam. The static Fourier transform spectrometer 1 comprises a beam splitter 2, a mirror device 3, and a collection optic 4. The mirror device 3 comprises in particular a mirror. In addition, the static Fourier transform spectrometer 1 has a line detector 12. As an alternative to the line detector 12, in particular, an area detector or a point detector can also be used.

An incident light beam 5, which is emitted by a light source 14 and is to be spectrally resolved, is guided as an uncollimated light beam at the point A onto the beam splitter 2, which has the depth $T_{ST}$ and the refractive index $n_{ST}$, and split by the beam splitter into two partial beams. Thus, a first arm 6 and a second arm 7 are formed. The material of the beam splitter 2 is selected to have a higher refractive index than the environment. It applies that $n_{ST} > n_L$, where $n_L$ is the refractive index of the environment.

The partial beam reflected upward from the beam splitter 2, i.e., the first arm 6, is guided by the mirror device 3 by 90° to the right onto the point $B_2$. The beam transmitted by the beam splitter 2, i.e., the second arm 7, leaves the beam splitter 2 slightly offset downwards in the direction of point $B_1$. Here, the mirror device 3 is to be aligned so that a first rectilinear portion 8 of the first arm 6, which extends from the mirror device 3 to the collection optic 4, and a second rectilinear portion 9 of the second arm 7 extending from the beam splitter 2 to the collection optic 4, extend parallel to each other in the direction of collection optic. The points $B_1$ and $B_2$ have the same horizontal distance to the collection optic 4. The collection optic 4 preferably comprises a convex lens and merges the first arm 6 and the second arm 7 for interference 13 on the line detector 12.

The collection optic 4, in particular provided as a convex lens, merges both partial beams on line detector 12 for interference 13. The distance to the collection optic 4 is exactly the focal length f of the convex lens. The interferogram generated on the line detector 12 is then transformed by a Fourier transformation into the spectrum of the incident light 5 entering the spectrometer. The collection optic 4 preferably has a focal length of 50 millimeters.

Due to the higher refractive index of the beam splitter $n_{ST}$ compared to that of the environment $n_L$, the phase velocity of the light beam in the beam splitter 2 is reduced. Thus, the optical path length of the path from A to $B_1$ no longer corresponds to its geometric length. With increasing refractive index and increasing depth of the beam splitter, the distance between optical and geometric path lengths increases on the path from A to $B_1$. The materials commonly used in the infrared region, zinc selenide (ZnSe) and germanium (Ge), have refractive indices of about 2.4 for ZnSe and about 4 for Ge, constituting great differences to the refractive index of the ambient air, which is about 1. Therefore, large differences between the optical and geometric path lengths can be generated along the path from A to M. Thus, in vacuum there is only on the second arm 7 a difference between the optical and geometric path lengths. If the second arm 7 travels through ambient air, there is only on the second arm 7 a significant difference between the optical and geometric path lengths.

In the static Fourier transform spectrometer 1, the vertical distance between the beam splitter 2 and the mirror $d_{ST-S}$ is chosen such that, taking into account the depth $T_{ST}$ and the refractive index of the beam splitter $n_{SR}$, the optical path lengths of the paths from A to $B_1$ and from A to $B_2$ are identical. Thus, it is possible to represent the interferogram symmetrically about the path difference of zero (Zero Path Difference, ZPD) on the line detector 12. In addition, by slightly varying the vertical distance between the beam splitter 2 and the mirror $d_{ST-S}$, the interferogram can be shifted on the line detector 12 without loss of light, so that a one-sided representation of the interferogram around the zero path difference without loss of light power becomes possible.

For the greatest possible light throughput, the uncollimated light source 14 is brought as close as possible to the beam splitter 2, to be able to expose the collection optic 4 to a cone of light that is as large as possible without colliding with the narrowest points inside of the static Fourier transform spectrometer between beam splitter 2 and mirror device 3. This is especially difficult if no optical waveguide is used as the light source 14. One way to address this problem is found in the second exemplary embodiment.

If the parallelism of the two partial beams, i.e., the first rectilinear portion 8 and the second rectilinear portion 9, in front of the collection optic 4 is secured, the present disclosure has no dependencies between the radiating surface of the light source 14 and the visibility of the interferogram. This is particularly relevant in the mid-infrared range, since black emitters are generally used as light sources 14, which have a relatively low power density in the mid-infrared range. The light outputs necessary for current line detectors 12 can therefore usually be generated only by light sources 14 with large radiating surfaces.

However, the greater the radiating surfaces of the light sources 14 at the entrance of the set-up are, the smaller the allowed deviations from the parallelism of the two partial beams can be in order not to jeopardize a sufficient visibility of the interferogram. Since the parallelism is determined by the angle of the mirror device 3, larger radiating surfaces require more precise adjustment of the mirror device 3. It should be noted, however, that the in practice relevant radiating surfaces of several millimeters in diameter do not cause great adjustment problems. Because only one mirror device 3 is to be adjusted in the static Fourier transform spectrometer 1, the set-up proves to be adjusted more easily than the static modified Mach-Zehnder interferometer presented in the prior art (see FIG. 2), where an adjustment of three mirrors is necessary.

The spectral resolution of the present spectrometer, as in all spectrometers based on Fourier transformation, in a reciprocal relationship to the maximum buildable path length of the structure. This path length difference depends on the distance between the two parallel partial beams s, the focal length f of the lens, and the length of the line detector. Here, the distance of the partial beams s is changeable by the characteristics of the beam splitter, i.e., depth $T_{ST}$ and refractive index $n_{ST}$, and the focal length f as a characteristic of the lens. Practical values for f, in particular 50 mm, for s, in particular 6 mm, and for $l_{DET}$, in particular 12.8 mm, allow for a good miniaturization of the present spectrometer.

Because the number of sampling points in the interferogram is limited by the use of a line detector 12 with a finite number of pixels, the spectral bandwidth of the light to be analyzed must be limited so as not to violate the Shannon-Nyquist criterion. Since the distance of the sampling points depends on the maximum path length difference present at the detector and thus on the spectral resolution of the set-up, a compromise between spectral bandwidth and resolution must be made in the design on the basis of the available number of pixels.

In the static Fourier transform spectrometer 1, the incident light passes through each optical element only once, so that a small loss of light is ensured. In contrast, for example, the common-path interferometer that can also be used in the mid-infrared region (cf. FIG. 1) inherently has a light loss of at least 50% because half of the light output is coupled out by the beam splitter 2 during the second passage of the light.

Because of the single passage of the light through the beam splitter 2, a wavelength-dependent phase offset between the two partial beams is formed on the line detector 12, since the refractive index of the beam splitter has a wavelength dependence. When superimposing the interference effects at different wavelengths, the resulting interferogram shows a significantly flattened center peak at the path difference of zero due to the dependence of the phase shift on the wavelength. This reduces the demands on the detector in terms of its dynamics, while the subsequent algorithmic correction of the spectrum is made more demanding.

Figure 6:
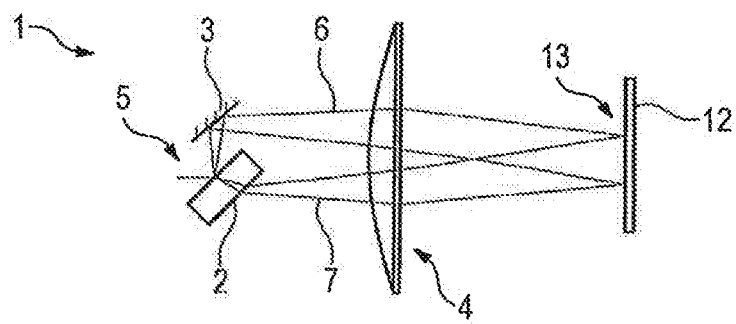
FIG. 6 shows the static Fourier transform spectrometer according to the first exemplary embodiment of the disclosure in operation.

FIG. 6 shows the static Fourier transform spectrometer 1 of FIG. 3 during an experiment. In this case, the detector image shown in FIG. 7 was obtained. The interference fringes expected for a monochromatic light source can be clearly seen, with the lines appearing somewhat curved. This effect is due to the fact that both partial beams cover the same optical, but a different geometric path length up to the collection optic 4. If a line detector 12 is used, this effect reduces the visibility of the interferogram only slightly due to the usually small detector widths. However, if the entire cross section of both partial beams is to be focused on the line detector 12 to increase the light throughput, this effect presents a problem. A possible solution for this is shown in the second exemplary embodiment.

In a further exemplary embodiment, an amplified spontaneous emission (ASE) light source was selected as the light source 14 to be measured. This low coherence length light source has a wavelength range of about 1525 nm to 1565 nm—the so-called C-band—and has a very high-power density. A 256-pixel PbS line detector was used as the line detector 12, while a ZnSe beam splitter having a depth of 3 mm was used as the beam splitter 2.

Figure 8:
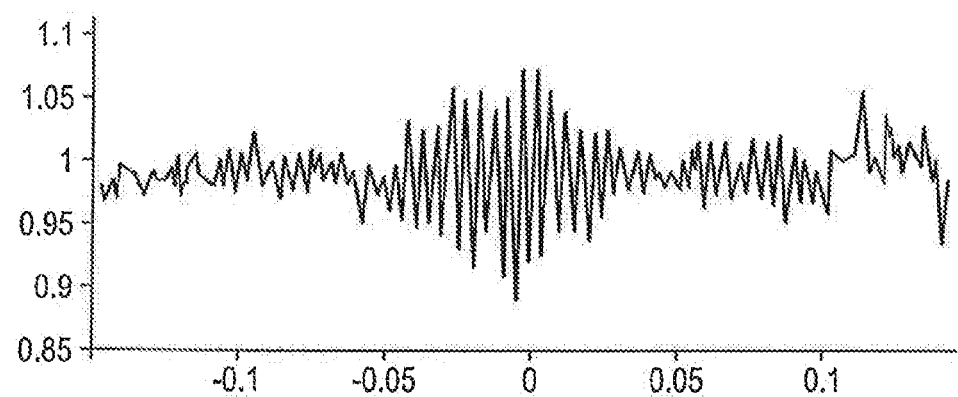
Figure 9:
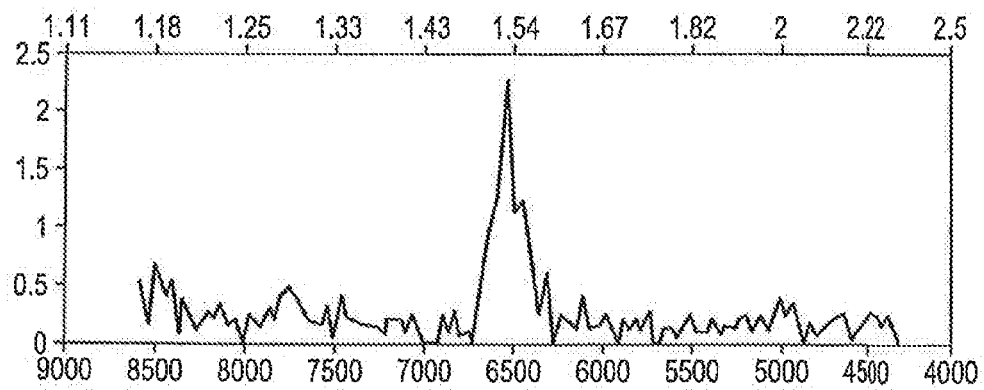
FIG. 9 shows a spectrum calculated from the interferogram of FIG. 8.

The small number of detector pixels compared to the low wavelength range of the light source 14 in this experiment necessitated the use of a convex lens with a focal length of 300 mm as the collection optic 4, so as not to violate the Nyquist-Shannon theorem. The high focal length of the convex lens reduced the maximum path length difference at the line detector 12 and thus the distance of the sampling points in the interferogram to an allowable level, whereby ultimately only a very low spectral resolution could be achieved. FIG. 8 shows the interferogram recorded in this experiment, the abscissa axis representing an optical path length difference in millimeters, while a normalized intensity is plotted over the ordinate axis. FIG. 9 shows the spectrum calculated therefrom, wherein the lower abscissa axis shows a wavenumber in 1/cm and the upper abscissa axis shows the corresponding wavelengths in µm, while the normalized intensity is plotted on the ordinate axis.

It can be seen from FIGS. 8 and 9 that with the present disclosure light having a short coherence length can be brought to visible interference on a line detector 12. In this case, any positioning of the zero path difference on the line detector 12 is feasible, with a central position being selected here. The calculated spectrum coincides with the wavelength range emitted by the light source, so that the operation of the present disclosure as a spectrometer has been shown.

Second Exemplary Embodiment: Focus Shift with a Convex Lens

Figure 4:
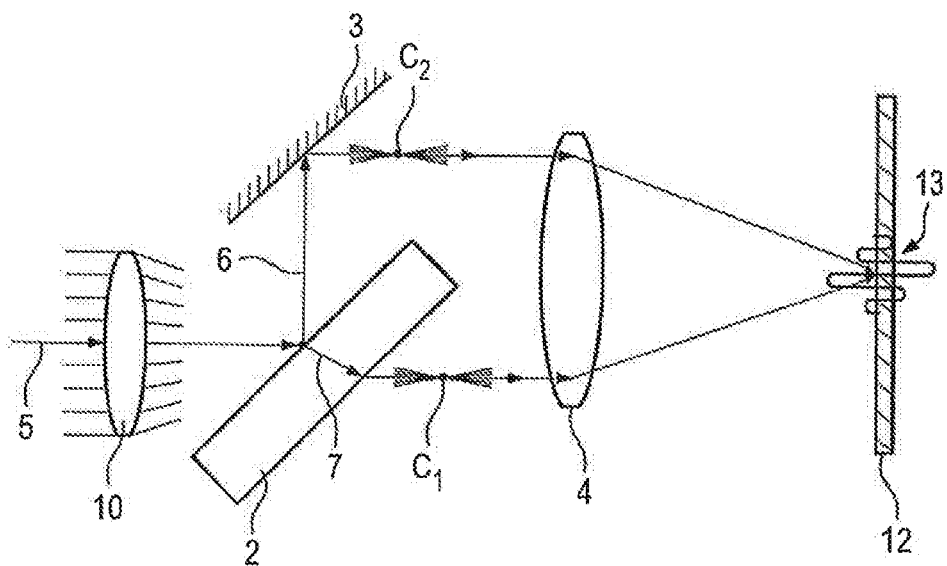
FIG. 4 shows a static Fourier transform spectrometer according to a second exemplary embodiment of the disclosure.

Previously, the need for close positioning of the light source 14 in front of the beam splitter 2 to ensure high light throughput was mentioned. Since this leads to problems in many cases, the second exemplary embodiment shown below describes a possibility of spectrally measuring collimated radiation from more distant light sources 14 with simultaneously improved throughput of light by the use of an upstream optic 10. The upstream optic 10 in particular comprises a second lens. FIG. 4 shows the second exemplary embodiment of the disclosure, which corresponds to the first exemplary embodiment, but with an additional lens.

If, in an application, approximately collimated light is available from the light source 14 to be spectrally measured, a further convex lens can be attached to the input of the structure as an upstream optic 10. This upstream optic bundles the incoming light to a new focal point. This focal point reproduces the uncollimated light source 14 of the inventive set-up shown in FIG. 3.

If, however, by placing the first convex lens such that a new focal point is produced behind the beam splitter 2, the splitting of the light at the beam splitter 2 produces two focal points $C_1$ and $C_2$ instead of one. The positioning of these two focal points can be arranged such that the narrow points within the spectrometer are avoided, such that the largest possible beam of light can be guided collision-free within the spectrometer. Thus, the light throughput and consequently the signal-to-noise ratio of the static Fourier transform spectrometer 1 increase.

The two convex lenses of the upstream optic 10 and the collection optic 4 can also be replaced by an off-axis concave mirror, without changing the operation of the spectrometer according to the second exemplary embodiment. This will reduce light loss and wavelength dependency of the spectrometer because concave mirrors have a lower loss of light and a lower wavelength dependence than convex lenses.

Third Exemplary Embodiment: Light Bundling by Cylindrical Lens

Figure 7:
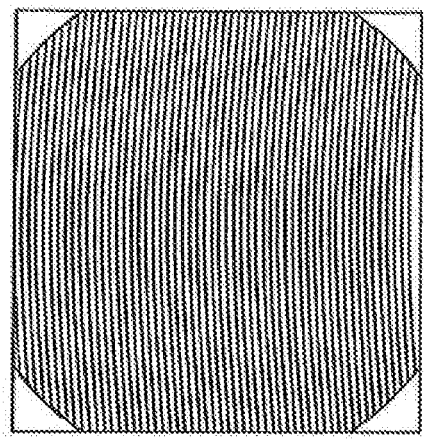
FIG. 7 shows a detector image from the operation of the static Fourier transform spectrometer according to the first exemplary embodiment of the disclosure shown in FIG. 6, FIG. 8 shoes an interferogram taken with the static Fourier transform spectrometer according to the first exemplary embodiment of the disclosure.

By using a convex lens as collection optic 4 to generate the interference 13, the interference phenomenon in the plane of the line detector 12 is basically projected onto a surface whose side length must correspond to at least the length of the line detector 12. This effect is shown in FIG. 7. Since the presently available line detectors 12 usually have a very small height of about 500 µm, a large part of the interference effect cannot be recorded by the line detector 12. A loss of light output results.

Figure 5:
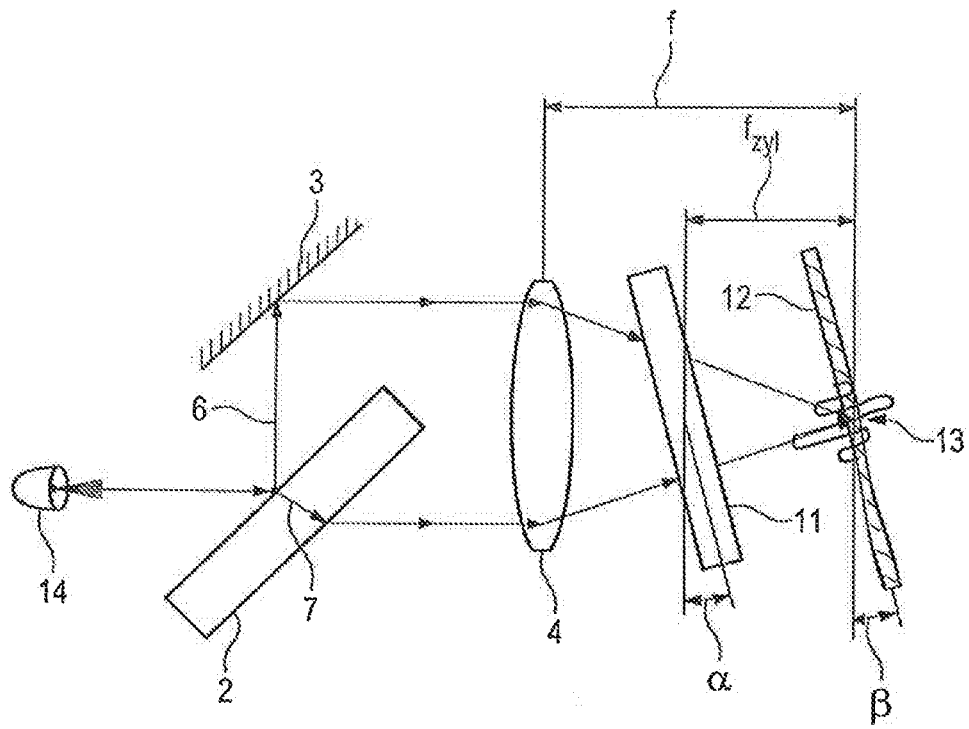
FIG. 5 shows a static Fourier transform spectrometer according to a third exemplary embodiment of the disclosure.

However, by using a cylindrical lens as the downstream optic 11, it is possible to focus the dimension perpendicular to the length of the line detector 12 onto the line detector 12 and thus to significantly minimize the loss of light. Since in the present spectrometer equal path length differences perpendicular to the line detector 12 are not linear, but curved, a simple insertion of a cylindrical lens as downstream optic 11 in the beam path would lead to a merger of close-lying path length differences and thus to a significant blurring of the interferogram. However, it has surprisingly been found that this effect is substantially reduced by rotating the downstream optic 11 and the line detector 13. FIG. 5 illustrates such an insertion of a cylindrical lens.

The cylindrical lens is placed between collection optic 4 and line detector 12 so that the line detector 12 lies exactly in the focal length of the cylindrical lens $f_{ZYL}$. Now, the cylindrical lens is rotated by exactly the angle $\alpha$ that minimizes the blurring effect of the interferogram. The cylinder axis of the cylindrical lens runs parallel to the paper plane, so that the cylindrical lens can focus the incident light along the line detector 12. Subsequently, the line detector 12 undergoes a rotation by exactly the angle β, which leads to an optimal focusing of the interferogram on the line detector 12. The optimum angles α and β are dependent on the geometry of the disclosure and thus, inter alia, on the nature of the beam splitter 2 and the collection optic 4.

Figure 10:
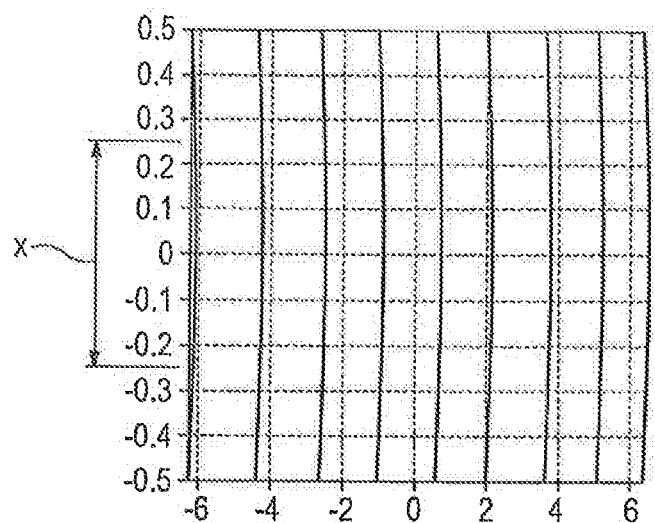
FIG. 10 shows a schematic diagram of the path length differences in the static Fourier transform spectrometer according to the second exemplary embodiment of the disclosure.
Figure 11:
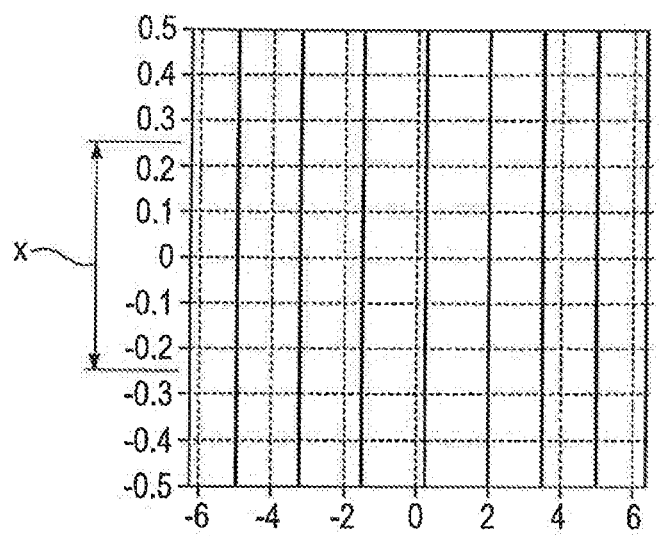
FIG. 11 shows another schematic course of the path length differences in the static Fourier transform spectrometer according to the second exemplary embodiment of the disclosure.

FIG. 10 shows the contour lines of the path length difference profile for a non-rotated cylindrical lens, while FIG. 11 shows the profile for a cylindrical lens rotated around α. In both cases, the abscissa axis and the ordinate axis show a respective detector position in millimeters. The line detector 12 was rotated in each case by the appropriate angle β. Comparing the two figures, it can be seen that a cylindrical lens rotated by α minimizes the curvature of the path length difference profile and again leads to an approximately linear curve. Therefore, a focusing of the interferogram on the line detector and thus a reduction of the light loss in the spectrometer is made possible, while still obtaining good visibility of the interferogram. In addition, FIGS. 10 and 11 show a respective pixel height x, for example, 500 micrometers.

As an alternative to a rotated cylindrical lens as downstream optic 11, optics that are specifically adapted to a particular set-up can be provided, such as adapted concave mirrors that are mounted to further reduce the light loss in the arrangement.

Fourth Exemplary Embodiment: Imaging Spectrometer Variant

Figure 12:
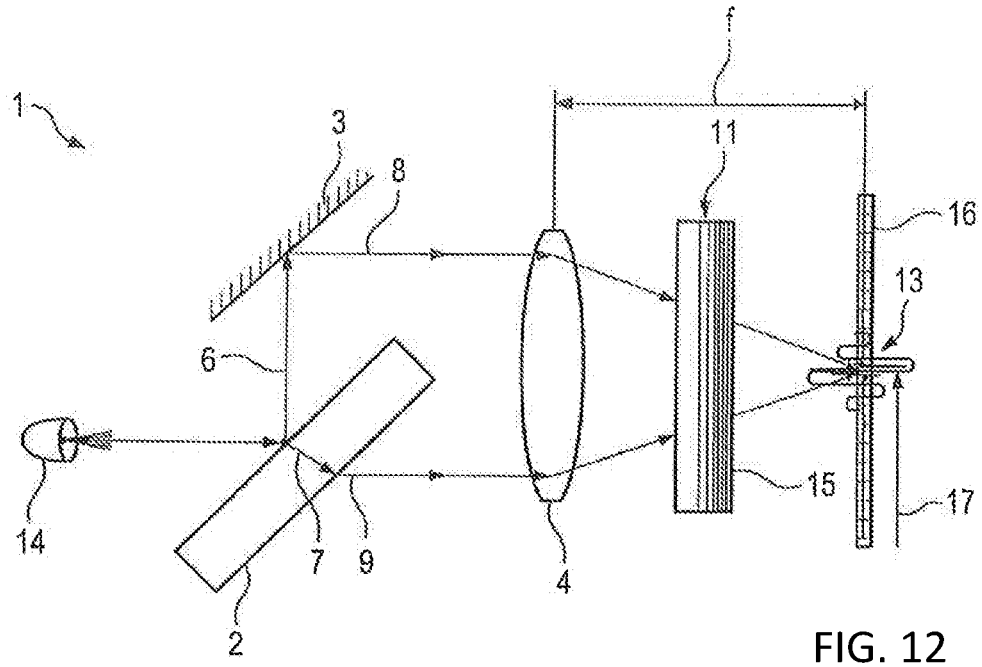
FIG. 12 shows a first schematic illustration of a static Fourier transform spectrometer according to a fourth exemplary embodiment of the disclosure.
Figure 13:
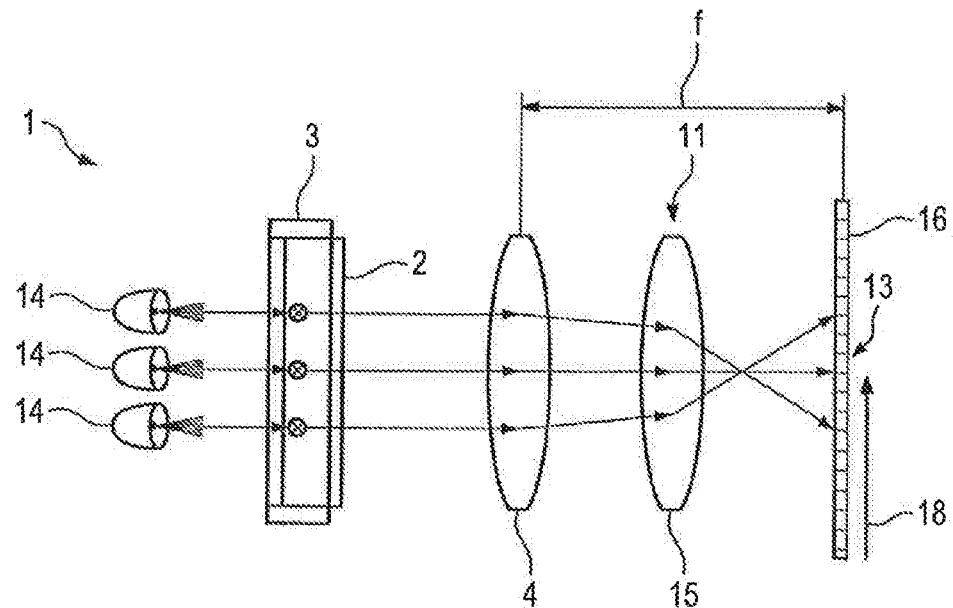
FIG. 13 shows another schematic diagram of the static Fourier transform spectrometer according to the fourth exemplary embodiment of the disclosure.

FIGS. 12 and 13 show a fourth exemplary embodiment of the static Fourier transform spectrometer according to the disclosure. In the fourth exemplary embodiment, an array area detector 16 is used. FIG. 12 shows a view of the static Fourier transform spectrometer 1 such that a first dimension 17 of the array area detector 16 is shown. FIG. 13 shows a view in which a second dimension 18 of the array area detector 16 is shown.

Figure 14:
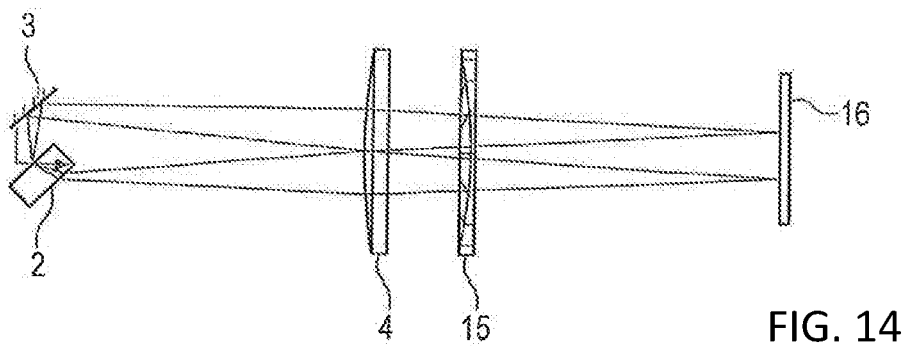
FIG. 14 shows a schematic diagram of the static Fourier transform spectrometer according to the fourth exemplary embodiment of the disclosure in operation.
Figure 15:
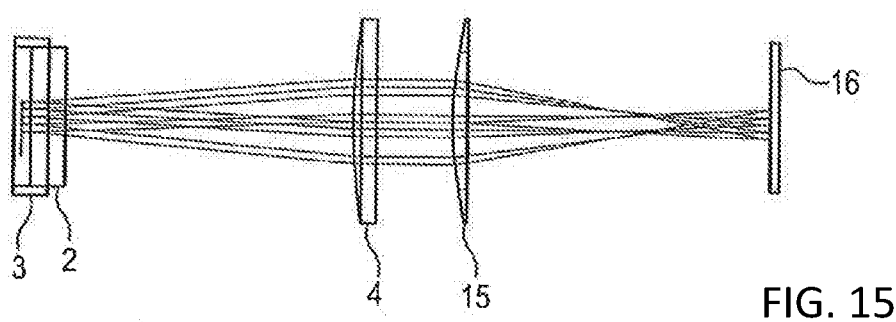
FIG. 15 shows a further schematic illustration of the static Fourier transform spectrometer according to the fourth exemplary embodiment of the disclosure in operation.

Similarly, FIGS. 14 and 15 show the static Fourier transform spectrometer 1 in operation, the view of FIG. 14 corresponding to the view of FIG. 12, while the view of FIG. 15 corresponds to the view of FIG. 13.

The basic structure of the static Fourier transform spectrometer 1 is the same as that of the first exemplary embodiment. However, instead of the line detector 12, an array area detector 16 is used, with which a detection of light in two dimensions 17, 18 is made possible. In addition, a cylindrical lens 15 is additionally present, which acts as a downstream optic 11. Through the cylindrical lens 15 together with the collection optic 4, a column-shaped row of light sources 14 is imaged on the array area detector 16 along the second dimension 18 of the array area detector 16, wherein in addition the spectral information is measured spatially resolved along this row. In this way, the static Fourier transform spectrometer 1 becomes a hyperspectral spectrometer. Due to the different geometric paths of the first arm 6 and the second arm 7, the spatial resolution is limited.

From FIG. 12 it can be seen that the cylinder axis of the cylindrical lens 15 is parallel to the plane of the drawing. In the plane shown in FIG. 12, the cylindrical lens 15 thus has no influence on the beam path. The array area detector 16 is positioned in the focal plane of the collection optic 4. In turn, a convex lens or an off-axis concave mirror can serve as collection optic 4.

In the second dimension 18 shown in FIG. 13, the cylindrical lens 15 creates an image of a series of light sources 14 on the array area detector 16. The collection optic 4 is optimally a convex lens, so that a lens system is produced in this dimension. Alternatively, instead of a convex lens, it is also possible to use a further cylindrical lens for the collection optic 4, which is rotated by 90° with respect to the cylindrical lens 15. In this case, a matching of the focal length and position of the cylindrical lens 15 with respect to a focal length of the collection optic 4 is avoided.

FIGS. 14 and 15 show the static Fourier transform spectrometer 1 according to the fourth exemplary embodiment in operation. In particular, curved progressions of the individual interferograms, i.e., the images of the interference 13, can be seen. In this case, an overlap of the interferograms of individual light sources 14 is typically avoided. This can be achieved in particular by additional imaging systems in front of the static Fourier transform spectrometer 1 or by using a plurality of fiber optic inputs as light sources 14. With the static Fourier transform spectrometer 1 according to the fourth exemplary embodiment, multiple locations can thus simultaneously be measured spectrally. The visibility of the interferograms is also not dependent on the radiation surface of the light sources 14.

Fifth and Sixth Exemplary Embodiments: Increasing Resolution by Stepped Mirrors

Figure 16:
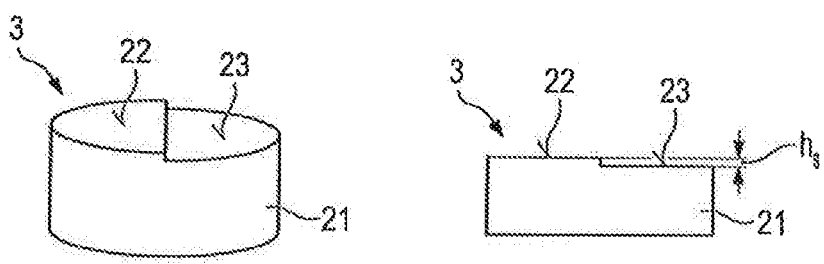
FIG. 16 shows a mirror device of a static Fourier transform spectrometer according to a fifth exemplary embodiment of the disclosure.

FIG. 16 schematically shows a mirror device 3 of a static Fourier transform spectrometer 1 according to a fifth exemplary embodiment. The mirror device 3 comprises a stepped mirror 21, the steps of which provide for a constant displacement of the path differences in comparison to a plane mirror device 3. typically, the step heights are chosen so that they lead to a perfect transition between the individual path difference ranges. In practice, however, a slight overlap of the path difference ranges and thus a slightly lower step height should be sought, so that an easier algorithmic correction and a more robust operation of the static Fourier transform spectrometer 1 is possible.

Figure 17:
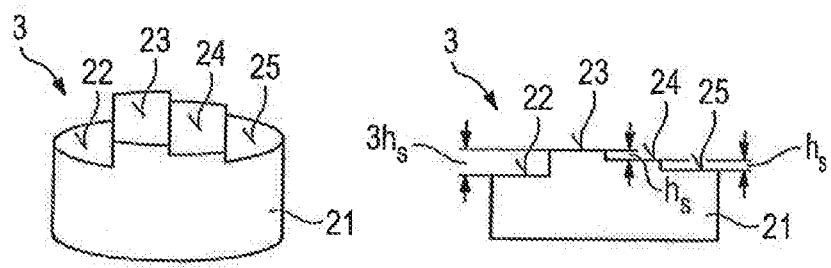
FIG. 17 shows a mirror device of a static Fourier transform spectrometer according to a sixth exemplary embodiment of the disclosure.

The stepped mirror 3 of the static Fourier transform spectrometer 1 according to the fifth embodiment includes, as shown in FIG. 16, two mirror surfaces—a first mirror surface 22 and a second mirror surface 23, which are stepped. FIG. 17 shows a stepped mirror 3 of a static Fourier transform spectrometer 1 according to a sixth exemplary embodiment, which has four mirror surfaces, a first mirror surface 22, a second mirror surface 23, a third mirror surface 24 and a fourth mirror surface 25, which are likewise stepped. The steps each have an integer multiple of a predefined step height $h_s$ as a distance from one another. Typically, each integer multiple is present only once, so that no mirror surfaces 22, 23, 24, 25 are located at the same level. In addition, there is a high level of parallelism of the steps. The necessary parallelism can be achieved easily and inexpensively with the aid of precision milling methods.

In FIG. 16, the first mirror surface 22 is spaced from the second mirror surface 23 by a single step height $h_s$. In FIG. 17, the first mirror surface 22 is spaced from the second mirror surface 23 by three times the step height $h_s$, from the third mirror surface 24 by twice the step height $h_s$, and from the fourth mirror surface 25 by the single step height $h_s$. Thus, each of the second mirror surface 23 and the third mirror surface 24, and the third mirror surface 24 and the fourth mirror surface 25 are each displaced from another by a single height $h_s$.

Figure 19:
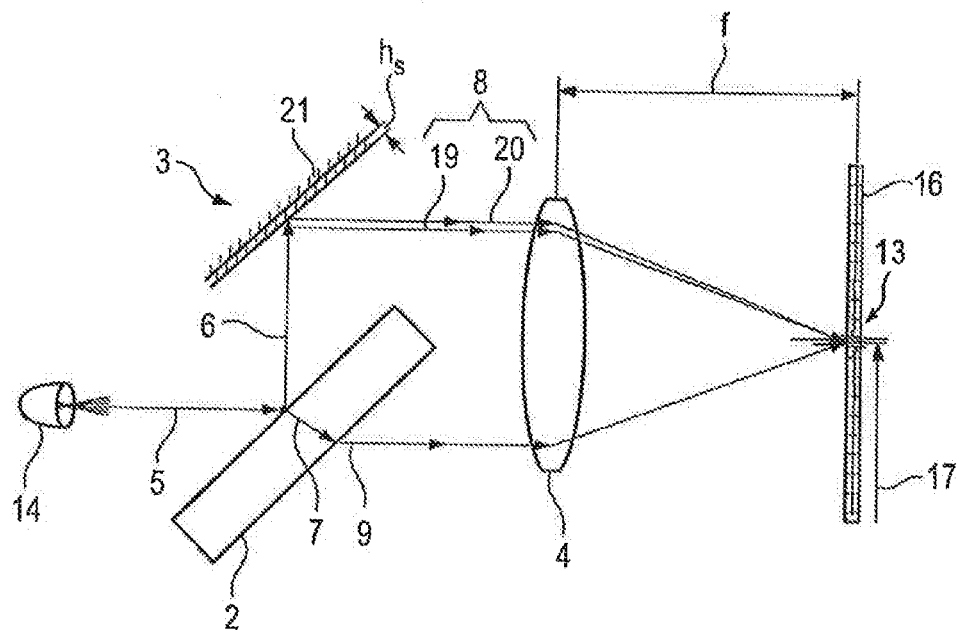
FIG. 19 shows a static Fourier transform spectrometer according to the fifth exemplary embodiment of the disclosure.

FIG. 19 schematically shows a static Fourier transform spectrometer 1 according to the fifth exemplary embodiment of the disclosure. In this case, the basic structure corresponds to that of the first exemplary embodiment. Only the mirror device 3, in contrast to the first exemplary embodiment, is provided as a stepped mirror 21. The stepped mirror 21 is also typically used in combination with the array area detector 16 in the static Fourier transform spectrometer 1. The array area detector 16 is typically identical to that of the fourth exemplary embodiment. As an alternative to the array area detector 16, other techniques may be used that allow two-dimensional sampling of the interference 13. Due to the high performance at low cost of array area detectors 16, especially in the infrared range, and the beam characteristic of the static Fourier transform spectrometer 1 according to the fifth exemplary embodiment in the plane of the array area detector 16, an implementation of the static Fourier transform spectrometer 1 according to the fifth exemplary embodiment is possible without much extra effort. Typically, in the dimension perpendicular to the plane of the paper, the source size of the light source 14 is to be restricted by appropriate light source design or by means of an iris, in such a way that the spatial coherence at the array area detector 16 is ensured.

Since the mirror device 3 has a first mirror surface 22 and a second mirror surface 23 as a stepped mirror 21, the first rectilinear section 8, which is formed by reflection of the first arm 6 on the mirror device 3, is divided into a first section 19 and a second section 20. Since the first mirror surface 22 and the second mirror surface are at a distance from one another of a single step height $h_s$, the respective resulting optical path differences from the first section 19 and from the second section 20 are different. This can be detected by the array area detector 16, so that computational merging can be performed. In this way, the total path difference of the static Fourier transform spectrometer is increased.

The array area detector 16 is divided into a plurality of sections, each of which maps other optical path differences. Ideally, the path differences of the individual sections do not overlap, or only slightly, so that the algorithmic combination of the individual sections results in a single contiguous interferogram with a significantly higher path difference range. Each of the individual sections is associated with one of the mirror surfaces 22, 23, 24, 25, so that due to the gradation of the stepped mirror 21 different path differences are mapped on the sections.

There is a reciprocal relationship between the maximum path difference of an interferogram and the spectral resolution of the associated spectrum, so that the spectral resolution of the resulting spectrum can be increased significantly. Ideally, each section increases the maximum path difference of the interferogram by the original path difference. Thus, two sections double the maximum optical path difference and thus halve the spectral resolution as compared to an identical spectrometer design without stepped mirror 21. Four sections quadruple the path difference and quarter the spectral resolution.

With more than two mirror surfaces 22, 23, 24, 25, the arrangement of the mirror surfaces 22, 23, 24, 25 is preferably selected so that disturbing reflections on the step walls of the mirror surfaces 22, 23, 24, 25 are avoided. Such reflections lead to not illuminated or incorrectly illuminated sections on the array area detector 16. Since the interferogram is finally derived algorithmically of the individual path difference sections, the arrangement of the mirror surfaces 22, 23, 24, 25 is arbitrary, so that disturbing reflections can be avoided in principle.

Figure 18:
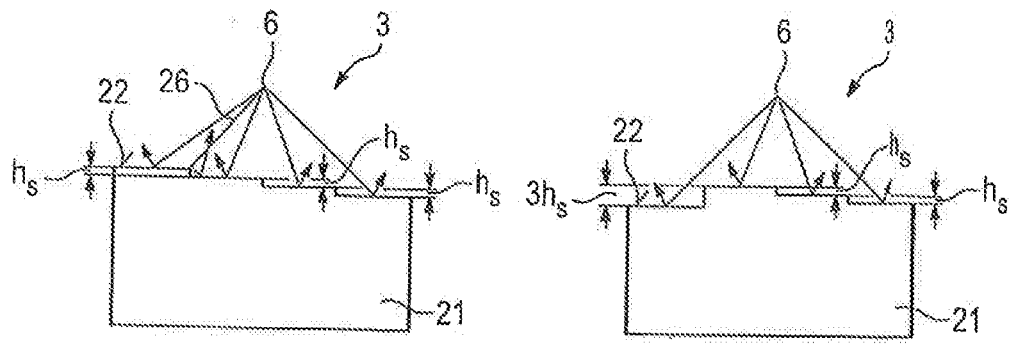
FIG. 18 shows a comparison of advantageous and disadvantageous mirror devices of the static Fourier transform spectrometer according to the sixth exemplary embodiment of the disclosure.

FIG. 18 shows on the left side a disadvantageous arrangement and on the right side an advantageous embodiment of the step level of the static Fourier transform spectrometer 1 according to the sixth exemplary embodiment. Starting from the first arm 6, the light from the light source 14 strikes the first mirror surface 22, the second mirror surface 23, the third mirror surface 24 and the fourth mirror surface 25. The left-hand illustration shows a step-shaped configuration. This results in a disturbing reflection 26 on the step wall of the first mirror surface 22. From the right figure, however, a convex shape of the level mirror 21 can be seen. There is no disturbing reflection, so that the convex shape is advantageous. As described above, an order in the gradation of the individual mirror surfaces 22, 23, 24, 25 is irrelevant.

If light sources 14 having a finite extent in the dimension perpendicular to the paper plane are used in the arrangement, then the same emission angles of the light source 14 at the step boundaries can lead to different path differences on the array area detector 16. Therefore, depending on the type of array area detector 16 and arrangement, the dimension of the light source 14 in the dimension perpendicular to the paper plane should be limited to ensure the spatial coherence of the interference phenomena at the array area detector 16.

The edges of the individual mirror surfaces 22, 23, 24, 25 can be aligned parallel to one another, as can be seen in FIG. 16 or in FIG. 17. Within the Fourier transform spectrometer 1, the edges of the mirror surfaces 22, 23, 24, 25 are advantageously aligned perpendicular to the second dimension 18 (cf. FIG. 13) of the array area detector 16. FIG. 19 shows the use of a level mirror 21 with exactly two stages, as shown in particular in FIG. 16. Thus, due to the described alignment of the edges of the first mirror surface 22 and the second mirror surface 23 on the array area detector 16 along the second dimension 18 (see FIG. 13) and perpendicular to the first dimension 17, different path difference sections can be achieved, wherein the path difference of each section is shifted exactly by the corresponding step height.

Figure 20:
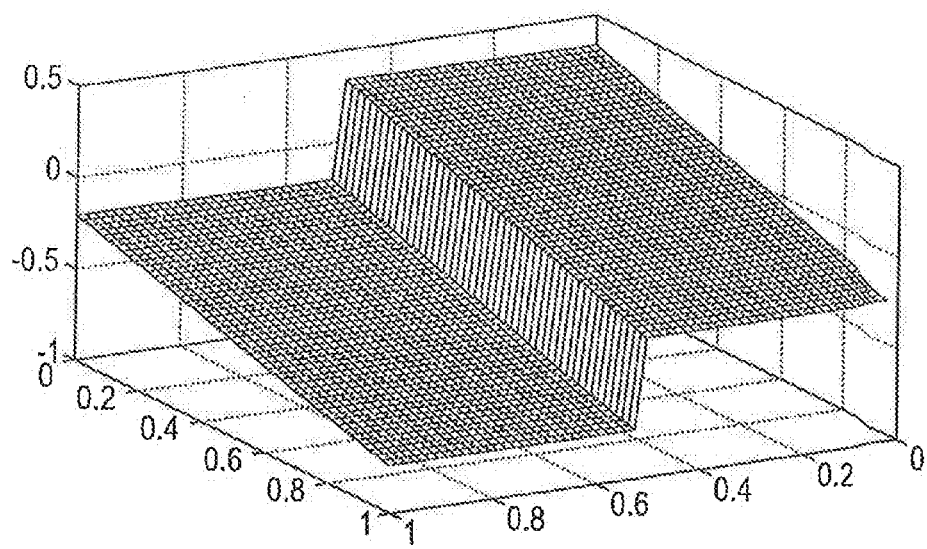
FIG. 20 shows a path length difference distribution taken with the static Fourier transform spectrometer according to the fifth exemplary embodiment of the disclosure.
Figure 21:
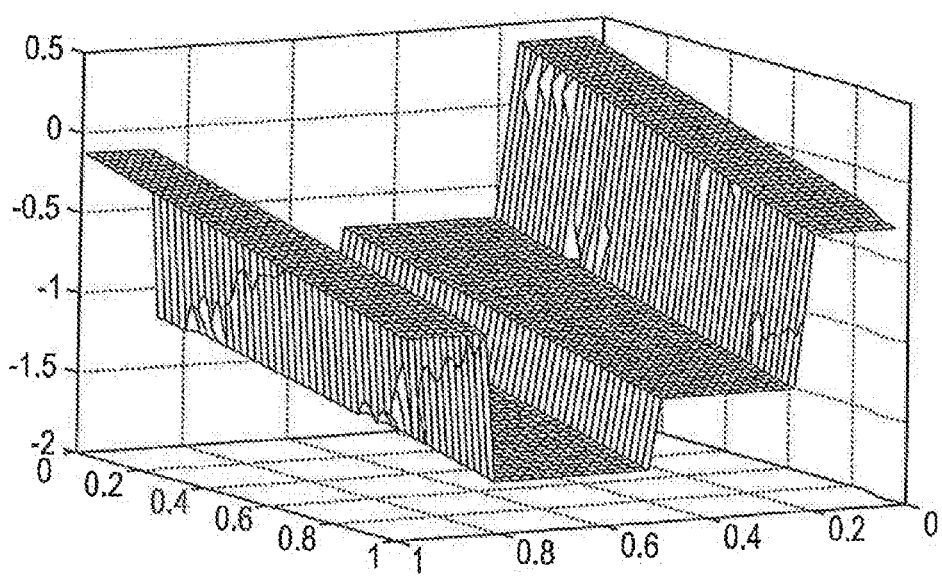
FIG. 21 shows a path length difference distribution taken with the static Fourier transform spectrometer according to the sixth exemplary embodiment of the disclosure.

FIG. 20 shows a map of a path length difference curve recorded by the array area detector 16 during operation of the static Fourier transform spectrometer according to the fifth exemplary embodiment of the disclosure. FIG. 21 shows an image of a path length difference curve recorded by means of the array area detector 16 during the operation of the static Fourier transform spectrometer according to the sixth exemplary embodiment of the disclosure. In both FIG. 20 and FIG. 21, the horizontal coordinate axes represent the first detector dimension 17 and the second detector dimension 18, while the vertical coordinate axis represents an optical path difference in millimeters.

The stepped characteristic of the optical path differences on the array area detector 16 can be easily recognized here. The array area detector 16 is thus subdivided into different sections, each section being assigned one of the mirror surfaces 22, 23, 24, 25. If the sections are combined algorithmically, an interferogram with a very high maximum optical path difference and thus a spectrum with a very fine spectral resolution results.

CONCLUSION

Areas of application for the novel spectrometer are particularly interesting spectroscopic applications under adverse environmental conditions in which only a low light levels are available. Under those conditions the advantages of the disclosure—the high robustness due to the static structure and the high signal-to-noise ratio due to the use of the Fourier transform principle—stand out. The compact design also allows for easy integration of the present spectrometer into existing systems, even when only limited space is available. Thus, the disclosure represents by its low material requirements and simple structure a very cost-effective solution for numerous spectroscopic problems.

Because for low light powers only spectrometers based on Fourier transforms can be used, competing systems for the presented disclosure are mainly time-modulating FTIR spectrometers. However, if a high degree of robustness is required of these systems, a complex compensation technique must be integrated in the spectrometer, whereby the market price of robust time-modulating FTIR spectrometer is well above the target price of the present spectrometer. As already noted in the State of the Art, the static FTIR spectrometer from KEIT is a spectrometer with a similar principle of operation on the market, but, due to the underlying structure at the beam splitter, has a power loss of at least 50% and thus losses in terms of signal noise ratio.

The present static FTIR spectrometer thus stands out in terms of price and performance over competing products already available on the market. Due to its high compactness, high performance, and low price, it opens up new fields of application for FTIR spectroscopy, which until now have not been economically viable.

The use of a stepped mirror significantly increases the spectral resolution of the static FTIR spectrometer according to the disclosure. The stepped mirror is also usable in the static FTIR spectrometer according to the first, second, and/or third exemplary embodiments of the disclosure. In addition, the convex lens can be replaced by off-axis concave mirror for wavelength-independent focusing.

In addition to the foregoing written description of the disclosure, reference is made to the accompanying drawings in which the drawings of the disclosure in FIGS. 3 to 21 are explicitly referred to.

The term "comprising" (and its grammatical variations) as used herein is used in the inclusive sense of "having" or "including" and not in the exclusive sense of "consisting only of" The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

LIST OF REFERENCE NUMBERS

1 Static Fourier transform spectrometer
2 Beam splitter
3 Mirror device
4 Collection optic
5 Incident light beam
6 First arm
7 Second arm
8 First rectilinear section
9 Second rectilinear section
10 Upstream optic
11 Downstream optic
12 Line detector
13 Interference
14 Light source
15 Cylindrical lens
16 Array area detector
17 First dimension of the array area detector
18 Second Dimension of the array area detector
19 First section of the first rectilinear section
20 Second section of the first rectilinear section
21 Stepped mirror
22 First mirror surface
23 Second mirror surface
24 Third mirror surface
25 Fourth mirror surface
26 Reflection

The invention claimed is:

1. A static Fourier transform spectrometer comprising:
a beam splitter,
a mirror device, and
a collection optic,
  wherein the beam splitter divides an incident light beam into a first arm and a second arm,
  wherein the first arm is reflected by the beam splitter and the second arm passes through the beam splitter,
  wherein the first arm, after reflection on the mirror device, travels without deflection to the collection optic,
  wherein the second arm, after passing through the beam splitter, travels without deflection to the collection optic,
  wherein the collection optic merges the first arm and the second arm for interference, and
  wherein only the first arm is reflected by the mirror device.

2. The static Fourier transform spectrometer according to claim 1, wherein a refractive index of the beam splitter is greater than a refractive index of an environment of the static Fourier transform spectrometer, so that an optical path of the second arm is different from a geometric path of the second arm.

3. The static Fourier transform spectrometer according to claim 1, wherein the mirror device is the only mirror device reflecting the first arm.

4. The static Fourier transform spectrometer according to claim 1, wherein the first arm has a first rectilinear portion extending between the mirror device, and the collection optic and the second arm has a second rectilinear portion extending between the beam splitter and collection optic, wherein the first rectilinear portion and the second rectilinear portion are aligned in parallel, or form an angle of at most 10° with each other.

5. The static Fourier transform spectrometer according to claim 4, wherein the angle is at most 1°.

6. The static Fourier transform spectrometer according to claim 4, wherein the angle is at most 0.5°.

7. The static Fourier transform spectrometer according to claim 1, further comprising a line detector, wherein the collection optic merges the first arm and the second arm on the line detector for interference.

8. The static Fourier transform spectrometer according to claim 1, further comprising a two-dimensional array area detector, wherein the collection optic merges the first arm and the second arm on the two-dimensional array area detector for interference.

9. The static Fourier transform spectrometer according to claim 1, further comprising:
an upstream optic, which is arranged in front of the beam splitter, so that the incident light beam travels from the upstream optic to the beam splitter,
wherein the upstream optic includes at least one of a convex lens and a concave mirror.

10. The static Fourier transform spectrometer according to claim 9, wherein the concave mirror is an off-axis concave mirror.

11. The static Fourier transform spectrometer according to claim 1, further comprising a downstream optic, which is arranged behind the collection optic, so that the first arm and the second arm of the collection optic can be merged for interference only after passing through the downstream optic, the downstream optic including a cylindrical lens.

12. The static Fourier transform spectrometer according to claim 11, wherein an optical axis of the downstream optic is tilted relative to a rectilinear portion of the first arm and/or the second arm by an angle between 0° and 40°.

13. The static Fourier transform spectrometer according to claim 1, wherein the collection optic includes at least one of a convex lens and a concave mirror.

14. The static Fourier transform spectrometer according to claim 13, wherein the concave mirror is an off-axis concave mirror.

15. The static Fourier transform spectrometer according to claim 1, wherein the mirror device includes a stepped mirror.

16. The static Fourier transform spectrometer according to claim 15, wherein the stepped mirror has at least two parallel mirror surfaces that are spaced apart from each other, respectively.

17. The static Fourier transform spectrometer according to claim 16, wherein a distance between each of the mirror surfaces is an integer multiple of a predefined step height ($h_s$).

18. The static Fourier transform spectrometer according to claim 16, further comprising an array area detector, wherein the collection optic merges the first arm and the second arm for interference on the array area detector, and wherein the array area detector is divided into different sections such that each of the different sections has a corresponding mirror surface to image at least two depict optical path differences between the first arm and the second arm in the different sections.

* * * * *